(12) United States Patent
Choi et al.

(10) Patent No.: US 6,232,987 B1
(45) Date of Patent: *May 15, 2001

(54) PROGRESSIVELY RENDERABLE OUTLINE FONT AND METHODS OF GENERATING, TRANSMITTING AND RENDERING THE SAME

(75) Inventors: Hyeong In Choi; Nam Sook Wee; Kyung Hwan Park; Sung Jin Lee; Sung Woo Choi; Hwan Pyo Moon; Seung Won Song, all of Seoul (KR)

(73) Assignee: Hyundai Electronics Industries Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,553

(22) Filed: Mar. 31, 1997

(30) Foreign Application Priority Data

Apr. 2, 1996 (KR) .................................................. 96-9927

(51) Int. Cl.⁷ ..................................................... G06T 11/60
(52) U.S. Cl. ........................................... 345/467; 345/471
(58) Field of Search ............................. 345/467, 470–71

(56) References Cited

U.S. PATENT DOCUMENTS

| | | |
|---|---|---|
| 5,272,543 | 12/1993 | Yanagisawa . |
| 5,301,267 | 4/1994 | Hassett et al. .................... 395/150 |
| 5,562,350 | * 10/1996 | Sakurai ............................. 345/471 X |
| 5,781,714 | * 7/1998 | Collins et al. ........................ 345/471 |
| 5,852,448 | * 12/1998 | Cheng .................................. 345/469 |
| 5,898,439 | * 7/1999 | Takazawa ............................. 345/467 |
| 5,982,387 | * 4/1999 | Hellman ........................... 345/468 X |

FOREIGN PATENT DOCUMENTS

| | | |
|---|---|---|
| 549944 | 7/1993 | (EP) . |
| 661670 | 5/1995 | (EP) . |
| 2245739 | 8/1992 | (GB) . |
| 63064090 | 3/1988 | (JP) . |
| 1140223 | 6/1989 | (JP) . |
| 5323937 | 12/1993 | (JP) . |
| 6019450 | 1/1994 | (JP) . |
| 7306670 | 9/1995 | (JP) . |
| 10039851 | 2/1998 | (JP) . |

OTHER PUBLICATIONS

Fractal Coding of Chinese Scalable Calligraphic Fonts by Horace H. S. Ip et al. P/.343–351.
Adobe to link PostScript fonts to Web Pages via HTML 3 spec, Staten James, MacWeek, v10, n9,p4(1) Mar. 4, 1996.

* cited by examiner

Primary Examiner—Mark R. Powell
Assistant Examiner—Chante' E. Harrison
(74) Attorney, Agent, or Firm—Blakely Sokoloff Taylor & Zafman

(57) ABSTRACT

This invention relates to an outline font, and more particularly to a progressive renderable outline font and methods for transforming and rendering the same. Its purpose lies in supplying a progressively renderable Font which can be varied according to the quantity of the data composing the font. The Progressively Renderable Font has the function of controlling the display speed and the quality of the font. For example, if the hardware speed is relatively slow and a high quality font is not needed, only a part of the font data will be transmitted and displayed. On the contrary, if the hardware speed is relatively fast and high quality font is needed, gradually increased data will be transmitted and displayed. Therefore, a font can be transmitted and displayed using minimal data without sacrificing quality. On the other hand, in case of the environment, all the data can be transmitted and displayed so that the quality of the font can be fully realized.

9 Claims, 20 Drawing Sheets

```
┌─────────────────────────────────┐
│         CLOSED CURVES           │
├─────────────────────────────────┤
│         BOX INFORMATION         │
├─────────────────────────────────┤
│      ON/OFF OF CONTROL POINTS   │
├─────────────────────────────────┤
│   COORDINATES OF CONTROL POINTS │
├─────────────────────────────────┤
│ CONNECTION BETWEEN CONTROL POINTS│
├─────────────────────────────────┤
│         OTHER CONTROL           │
└─────────────────────────────────┘
```

250 | 2 |

252 | 338 40 886 426 |

254 | 49    53 |

256
| 1 | 0 | 1 | 0 | 1 | 0 | 1 | 0 | 1 | 1 | 0 | 1 | 0 | 1 | 0 |
| 1 | 0 | 1 | 0 | 1 | 0 | 1 | 0 | 1 | 1 | 1 | 1 | 0 | 1 | 0 |
| 1 | 0 | 1 | 0 | 1 | 0 | 1 | 0 | 1 | 0 | 1 | 1 | 0 | 1 | 0 |
| 1 | 0 | 1 | 1 | 1 | 1 | 1 | 1 |   |   |   |   |   |   |   |

258
| 492 | 481 | 474 | 458 | 444 | 429 | 426 | 426 | 424 | 424 | 424 | 421 | 419 | 413 | 341 |
| 340 | 338 | 370 | 377 | 398 | 493 | 500 | 509 | 496 | 496 | 809 | 809 | 809 | 806 | 804 |
| 796 | 735 | 734 | 733 | 762 | 793 | 868 | 886 | 886 | 886 | 881 | 881 | 881 | 863 | 844 |
| 825 | 808 | 809 | 809 | 496 | 496 | 809 | 809 |     |     |     |     |     |     |     |

| 92 | 70 | 60 | 40 | 41 | 42 | 65 | 67 | 103 | 321 | 331 | 337 | 341 | 346 | 389 |
| 392 | 407 | 409 | 409 | 405 | 389 | 382 | 371 | 340 | 294 | 294 | 333 | 350 | 355 | 360 |
| 366 | 407 | 411 | 424 | 425 | 426 | 405 | 400 | 388 | 384 | 358 | 154 | 120 | 84 | 47 |
| 49 | 51 | 79 | 92 | 258 | 128 | 128 | 258 |   |   |   |   |   |   |   |

| # | 8 | 10 | 14 | 17 | 20 | 24 | 31 | Group |
|---|---|---|---|---|---|---|---|---|
| 1 | 825 | 49 | -31 | 998 | | | 1 | 380 |
| 2 | 886 | 388 | -50 | 1012 | | | 1 | |
| 3 | 398 | 405 | -71 | 1004 | | | 2 | |
| 4 | 444 | 41 | -36 | 999 | | | 3 | |
| 5 | 496 | 258 | -50 | 1065 | 106 | 1000 | 5 | |
| 6 | 809 | 258 | 106 | 1000 | -50 | 935 | 5 | |
| 7 | 809 | 128 | -50 | 935 | -206 | 1000 | 6 | |
| 8 | 496 | 128 | -206 | 1000 | -50 | 1065 | 7 | |
| 9 | 809 | 294 | -50 | 980 | -206 | 1000 | 2 | 382 |
| 10 | 496 | 294 | -206 | 1000 | -50 | 1023 | 9 | |
| 11 | 734 | 411 | -49 | 987 | -49 | 996 | 2 | 384 |
| 12 | 806 | 355 | -48 | 995 | -47 | 995 | 11 | |
| 13 | 340 | 392 | -48 | 985 | -49 | 997 | 3 | |
| 14 | 413 | 346 | 22 | 957 | -44 | 995 | 13 | |
| 15 | 492 | 92 | -39 | 1022 | 108 | 1000 | 4 | 386 |
| 16 | 809 | 92 | 108 | 1000 | -50 | 993 | 15 | |
| 17 | 426 | 65 | -50 | 998 | -47 | 977 | 14 | |
| 18 | 863 | 84 | -32 | 1036 | | | 1 | 388 |
| 19 | 762 | 425 | -79 | 999 | | | 2 | |
| 20 | 500 | 382 | -59 | 1011 | -57 | 1007 | 10 | |
| 21 | 881 | 358 | -50 | 1102 | -45 | 1026 | 18 | 390 |
| 22 | 868 | 405 | -125 | 1021 | | | 2 | |
| 23 | 496 | 340 | -50 | 1023 | -37 | 1031 | 10 | |
| 24 | 370 | 409 | -82 | 998 | | | 3 | |
| 25 | 809 | 79 | -51 | 972 | | | 16 | 392 |
| 26 | 881 | 154 | -50 | 1102 | | | 18 | |
| 27 | 796 | 366 | -42 | 994 | | | 11 | |
| 28 | 809 | 333 | -50 | 980 | | | 12 | |
| 29 | 424 | 321 | -50 | 891 | | | 14 | |
| 30 | 424 | 103 | -48 | 964 | | | 29 | |
| 31 | 474 | 60 | -43 | 1010 | | | 4 | |

FIRST CLOSED CURVE :

SECOND CLOSED CURVE :

FIRST CLOSED CURVE :

SECOND CLOSED CURVE :

FIRST CLOSED CURVE :

SECOND CLOSED CURVE :

FIRST CLOSED CURVE :

SECOND CLOSED CURVE :

PROGRESSIVELY RENDERABLE OUTLINE FONT AND METHODS OF GENERATING, TRANSMITTING AND RENDERING THE SAME

FIELD OF THE INVENTION

This invention relates to an outline font, and more particularly to a progressively renderable outline font (hereinafter referred to as a PR font) and methods of generating, transmitting and rendering the same.

BACKGROUND OF THE INVENTION

Generally, included within widely used graphical user environments, such as Windows 3.1, Windows 95, Windows NT, OS/2, UNIX X Window, Macintosh System 7, and Display Postscript, etc., are fonts and these fonts are displayed through a display device, such as a monitor. In these environments, postscript fonts of Adobe or true type fonts of Microsoft or Apple are widely used.

An outline font generally is composed of: information about the code map allotted to each character, information about the glyph indicating the shape of each character by specifying the positions of the control points, and hinting and other control information required for rasterization. This information is saved in a file called a font file.

Nowadays, approximately 1 to 10 MBytes are required to make a Korean or Chinese font. Therefore, up until now, this large amount of data has been a big hindrance to the on-line transmission of the outline characters via the network environment to another computer in a remote location which does not have the font to be used.

The normal procedure in displaying the font on a user's screen is that first, the computer's rasterizer must read the font file, and then generate a bitmap pattern. Then, the data is transmitted to the display device through a bus within a computer, or through a network, in the case of a network computer (the term 'network computer' is used to include all the computers with resources distributed in the network environment). However, a problem arises when the speed requirement of data transmission exceeds that which the hardware can support.

For example, when using a network computer, the font file and the rasterizer may be located in different places in the network. This perhaps is a very typical case when a TV or a simple set-top box is used as a network computer that accesses the internet. A simple solution is of course to first transmit the needed font file to the rasterizer of the network computer through the network. However, since the entire font file has to be sent before a single character can be displayed, this clearly is not an acceptable solution.

A similar problem arises when an internet user in America tries to browse a web site in Korea. If the data is written in Korean, the user in America must already have Korean font capabilities in order to display the data from the Korean web site. If the user in America does not have Korean font capabilities the entire Korean font file must first be transmitted to the user in America from the Korean web site before Korean characters can be displayed. In this case, if the size of the Korean font file is too large, a lot of time is required to transmit the data, and this again causes a big delay in displaying the Korean fonts.

Also, even when transmitting bitmap patterns through the bus within a computer, there is a situation in which a speed problem can arise. When fast browsing of a text file is required, all the glyph information of each character must first be read before the rasterization of the font begins. This causes some delay in quick displaying of the data when there is a large amount of glyph information. That is to say, a problem in the browsing speed can occur.

Until now, speed improvement methods like font cache have been used in font displaying. However, even these improvement methods cannot solve all the problems of the transmission speed when there is nothing in the cache.

SUMMARY OF THE INVENTION

Therefore, the present invention has been made in view of the above mentioned problems, and the present invention provides a progressively renderable font, the display quality and the transmission speed of which can be adjusted according to the requirements of the environment.

The progressively renderable font can adjust the speed of the display and the quality of the font in proportion to the environment and the objective. If the speed of the hardware is slow and a high quality font is not needed, only a part of the font data will be transmitted and displayed with a trade-off between the speed and display quality. On the other hand, if the speed of the hardware is relatively fast and a high quality font is needed, all the data will gradually be transmitted and displayed.

Therefore, when the environment does not allow, a font can be transmitted and displayed using minimal data. But when the environment allows, all the data can be transmitted and displayed so that the quality of the font can be fully realized.

In order to achieve the objective of the present invention, there is disclosed an outline font containing the glyph information of each character. The glyph information of each character comprises:

coordinates of control points composing each said character;

level information for transmitting or rendering each said character progressively; and an indexing information for dynamically expressing progressive connection relationships between each of the said control points when each said character is rendered progressively.

Also, in another aspect of the present invention, there is disclosed the glyph information of each character. The glyph information of each character comprises:

information of the maximal inscribed circle containing a control point as a contact point for establishing each said character;

level information for transmitting and rendering of each said character progressively; and an indexing information for dynamically indicating progressive connection relationships between each said maximal inscribed circle when each said character is rendered progressively.

Also, in another aspect of the present invention, there is disclosed a progressively rendering method. The method is formed by the steps of: first, extracting glyph information of each character of an outline font;

providing level and index information to each control point of each said character; and establishing a progressively renderable font file by collecting information on each character provided in the above steps.

Also, in another aspect of the present invention, there is disclosed a progressively rendering method. The method is formed by the steps of: first, determining a rendering level in accordance with a request of a user or an environment, and transmitting only additional data into a designated apparatus, excluding the already transmitted information;

calculating an outline of each character with data transmitted up to current level; and expressing each character progressively by rasterizing each said character using the outline obtained in the previous step.

BRIEF DESCRIPTION OF THE DRAWINGS

A further understanding of the nature and advantages of the present invention will become apparent by reference to the remaining portions of the specifications and drawings.

FIG. 2B shows an example of the glyph information;

FIG. 3B shows an example of the glyph information of the Korean character 'ㅂ' according to the present invention of the PR font;

DETAILED DESCRIPTION OF THE PREFERRED EMBODIMENT

A detailed description of an embodiment according to the present invention will be given below with reference to the figures.

Figure 1:
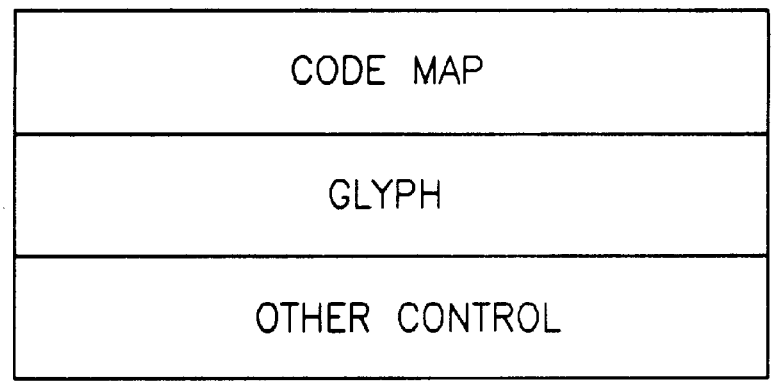
FIG. 1 shows the skeleton of the general data structure of an outline font.

FIG. 1 is the skeleton of the general data structure of the outline font. The outline font includes code map expressing allotted code information of each character, the glyph information of the characters comprising the outline font, and other control information, such as hinting.

Figure 2A:
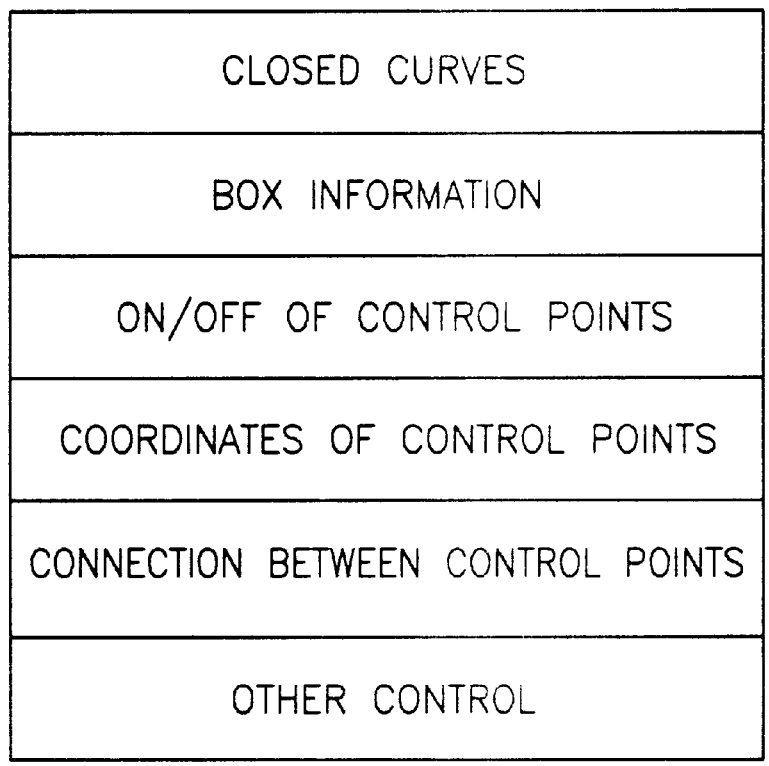
FIG. 2A shows the conventional data structure of the glyph information of each character.

FIG. 2A is the data structure of the conventional glyph information of each character. The conventional glyph information includes information on the number of closed contours needed to compose a character, the bounding box (or EM Box) information on a character, the on/off flags for the control points, the coordinates of the control points, the connection information between the control points, and other control information, such as hinting. FIG. 2B shows an example of the glyph information of the Korean character 'ㅂ' in true type font style format. Here, the hinting information is not shown. The reference number 250 indicates the number of the closed contour, 252 the EM-box information, 254 the ordinal numbers of the last control points at the end of each contour, 256 the on/off flag, and 258 the coordinates of the control points. The connection information here is the ordering of the on/off flag of 256 and the coordinates of the control points of 258.

Here, when ordering the control points, the counter-clockwise orientation is chosen for the outer boundary, and the clockwise orientation is chosen for all inner boundaries. According to this rule, the counter-clockwise orientation is the positive direction in the first closed contour in FIG. 2B. And for the second closed contour, the clockwise orientation is the positive direction.

Figure 3A:
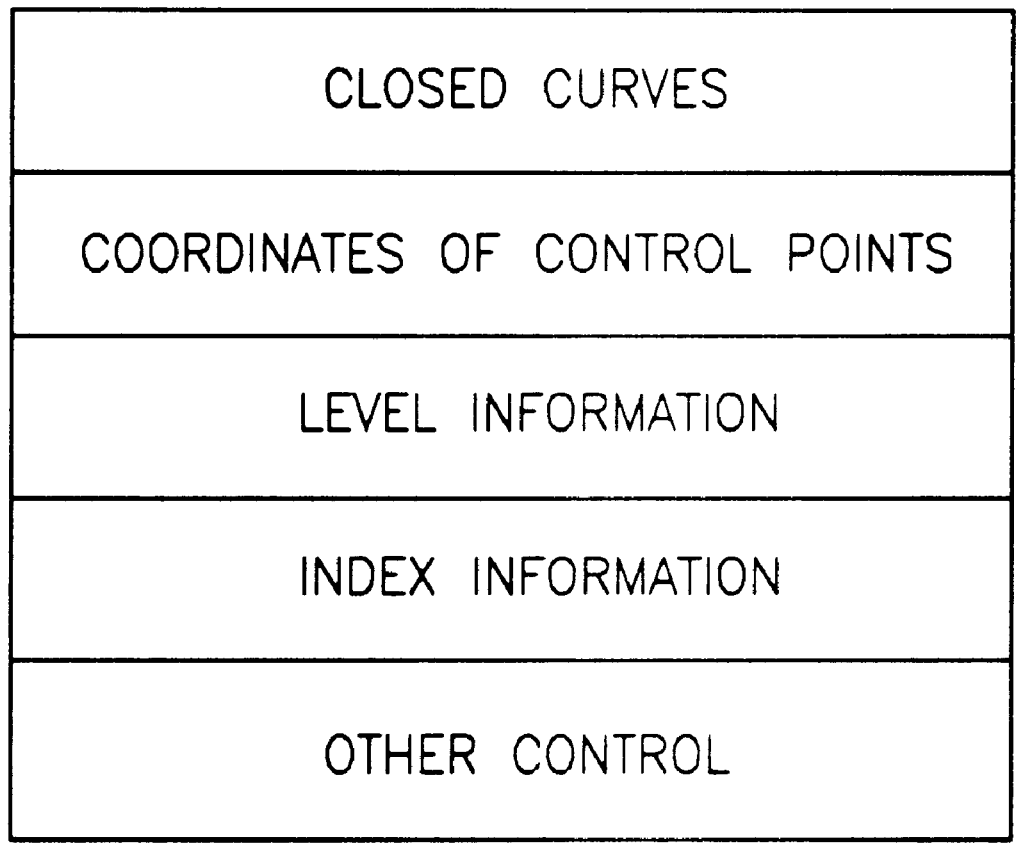
FIG. 3A shows the skeleton of the data structure of the glyph information of each character in a progressively renderable (PR) font, according to the present invention.

The PR font of this invention is the outline font including the information such as the code map of each character, the glyph information of each character, and other control information such as hinting, etc. FIG. 3A is the data structure of the glyph information of each character in the PR font. The glyph information of each character for the progressively rendering of the characters is composed of the information such as the number of closed contours needed to constitute each character, the coordinates of the control points composing the character, the level information expressing the orders of the control points, the index information expressing the connection relation on the closed contour between the control points, and other control information, such as hinting. FIG. 3B shows an example of the glyph information of the Korean character 'ㅂ' according to the PR font (other control information will not be shown). In the present invention, the quadratic curve, which is the basic graphic primitive of the true type font, will be used. However, the cubic Bezier curve, which is the basic graphic primitive of the postscript font, can also be used without altering the nature and the scope of the present invention.

In FIG. 3B item number 350 designates the total number of closed contours, 352 the ordinal numbers of the beginning control points of each closed contour, 354 the total number of levels, 356 the ordinal numbers of the ending control point of each level, and 358 the coordinates of the control points. The number 360 indicates the tangent vectors in the positive and negative directions of the curve looked at each control point. If the curve has no corner at the control point, the two tangent vectors point in the exact opposite directions, and if it has a corner, then the tangent directions of the incoming and outgoing curves at the control point may not match. The number 362 indicates the index information. Here, item 360 can be replaced by the off-point coordinates in the positive and negative directions at each point. The control points according to the present invention are divided into seven groups: 380, 382, 384, 386, 388, 390 and 392. In particular, this convention should be adopted in the case of the PR font using the cubic Bezier curve, such as the postscript font.

The PR font of the present invention has the merit of balancing the transmission speed and the font quality according to the environment and the purpose. But as already mentioned, since the PR font method is quite different from the conventional outline font, data of the conventional outline font must first be converted to the data in the PR font format so that the conventional outline font will function like the PR font. Therefore, a detailed explanation about the change of the outline font data to the PR font data will follow. (This procedure should be an off-line process if it takes longer to complete the conversion.)

One of the characteristics of the present invention that adds to its usefulness is that the conventional outline font can easily be converted to the PR font format by just adding the level information.

Figure 4:
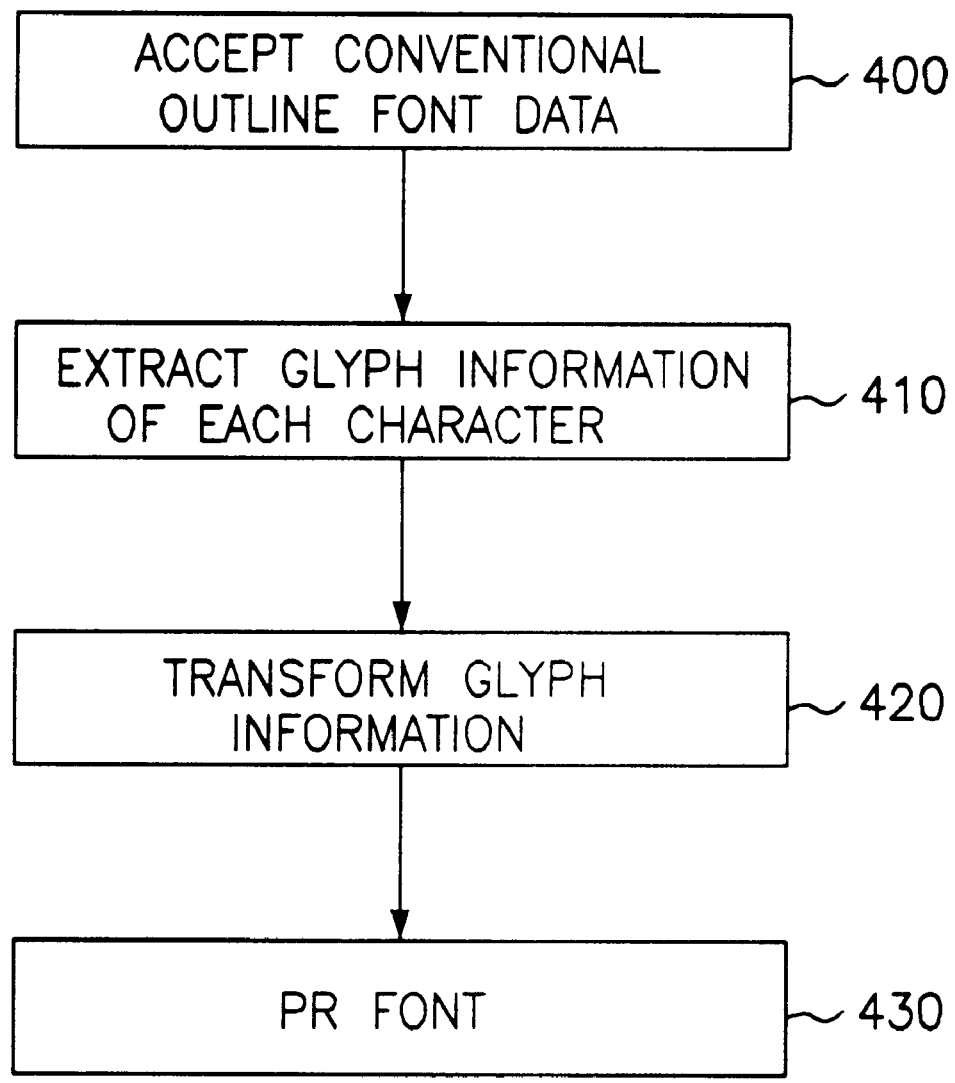
FIG. 4 shows a flow chart explaining the method of generating a PR font from the conventional outline font.

FIG. 4 is a flow chart explaining the method of the transformation from the conventional outline font to the PR font format. A detailed explanation is as follows:

First of all, in level 400, the conventional outline font data is first input. In level 410 the glyph information of each character composing the conventional outline font will be extracted. Here, the glyph information of each character includes the total number of closed contours needed to constitute a character, the box information assigned to a character, the on/off flags of the control points, the coordinates of the control points, the connection information between the control points, and other control information such as hinting.

In level 420, the extracted glyph information of each character will be transformed to the glyph information including the level information of the PR font 430 and the index information, as shown in FIG. 3A. FIG. 3B shows an example of the result of the glyph information of FIG. 2A processed through level 420.

The next step will be to determine the order of the control points(hereinafter, the control points will also be referred to as the point). In accordance with the order, each point will be numbered and the total number of the points included in each level will be recorded. This level information can be designated by the user, or through an appropriate algorithm, while factoring into consideration the transmission speed of each level in the PR font and the quality of the artistic expression of the font at each level.

Figure 5:
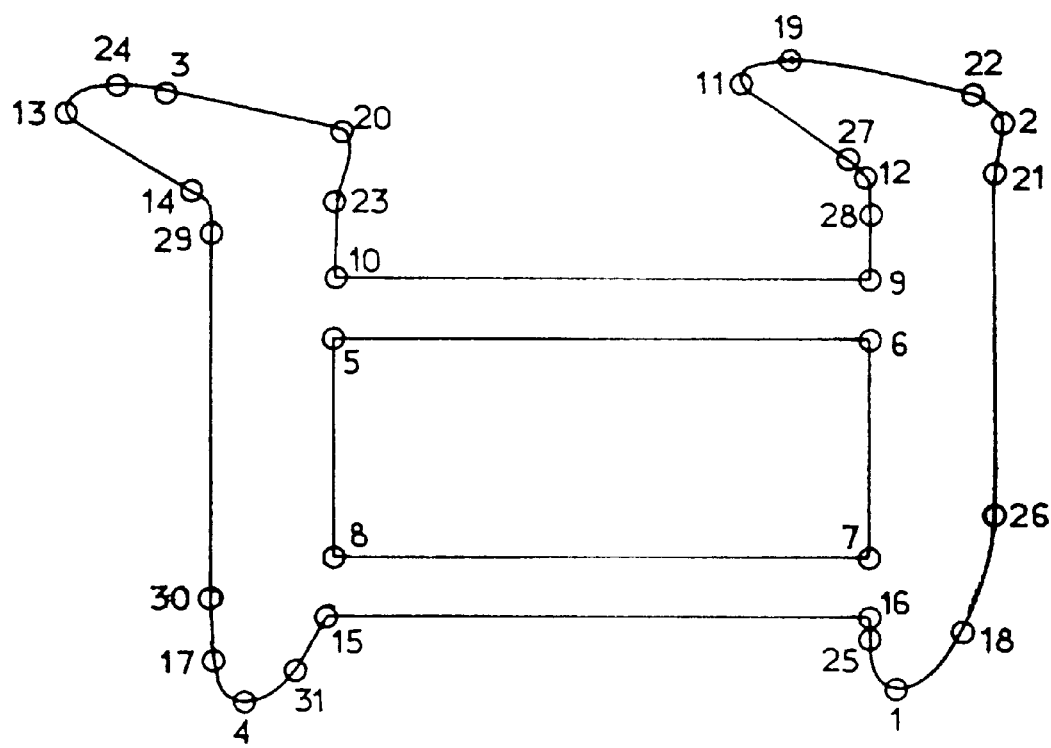
FIG. 5 shows the display results of FIG. 2B.

As an illustration, this process is applied to the example shown in FIG. 2B. FIG. 5 is the display results of FIG. 2B. The numbers indicate the ordinal numbers of the on-points of FIG. 2B. According to the order, numbers 1 to 31 are given to each point. Along with the numbering, the item 358 of FIG. 3B will be completed. That is, the x axis and the y axis of the on-points of FIG. 2B will be enumerated in accordance with the ordering. There are 7 levels chosen for this example (item 350), but it can vary according to each character. Item 356 of FIG. 3B is then completed with the last ordinal numbers of each point in the level, and this information is recorded as item 354 of FIG. 3B. And item 356 shows that the first level includes point 1 to point 8, the second level 9 to 10, the third level 11 to 14, the fourth level 15 to 17, the fifth level 18 to 20, the sixth level 21 to 24, and the seventh level 25 to 31.

Item number 360 indicates the tangent vectors in the negative and positive directions at the corresponding control point.

The next step is to record the index information of FIG. 3A using the connection condition of the points on each closed contour composing the characters. This can be explained through FIG. 3B.

First, the closed contour, including point 1, will be called the first closed contour. So the outer boundary curve in FIG. 5 is the first closed contour. After that, the smallest ordinal number corresponding to a point not on the first closed contour must be found after point 1. In this example, point 5 will be the smallest such number. The closed contour including point 5 will be called the second closed contour which, in this example, means the inner boundary curve. The result will be recorded in the item 352 of FIG. 3B.

The next step is to assign the index expressing the progressive connection status of each of the points on each closed contour. The algorithm for this is the General Indexing Algorithm below:

General Indexing Algorithm

Suppose that the conventional outline font has t closed contours (each is called the 1st, the 2nd, . . . , the t-th closed contour), and generally the s-th closed contour ($1 \leq s \leq t$) has on-points, $P_{N_{s-1}+1}, P_{N_{s-1}+2}, \ldots, P_{N_s}$.

For the clarity of explanation, let's assume that $N_0=0$ (Note that $N_t$ is the total number of the on-points on the first contour, and the number of on-points in the s-th($1 \leq ks \leq t$) closed contour are $N_s N_{s-1}$.)

And now, we introduce a function called NEXT: $\{1,2, \ldots, N_t\} \to \{1,2, \ldots, N_t\}$ expressing the connection condition of $P_1, \ldots, P_{N_t}$. That is to say that $P_{NEXT(n)}$ is defined to be the point which follows $P_n$. The formula is given as follows:

$$\text{NEXT: } \{1, 2, \cdots, N_t\} \to \{1, 2, \cdots, N_t\}$$
$$\text{NEXT}(n) = n + 1, \quad \text{if } n \neq N_1, N_2, \cdots, N_t$$
$$\text{NEXT}(N_k) = N_{k-1} + 1, \quad \text{if } k = 1, 2, \cdots, t$$

Furthermore, let us define another function PREV: $\{1,2, \ldots, N_t\} \to \{1,2, \ldots, N_t\}$ as the inverse function of NEXT. This can be expressed as follows:

$$\text{PREV: } \{1, 2, \cdots, N_t\} \to \{1, 2, \cdots, N_t\}$$
$$\text{PREV}(n) = n - 1, \quad \text{if } n \neq N_0 + 1, N_1 + 1, \cdots, N_{t-1} + 1$$
$$\text{PREV}(N_{k+1}) = N_k + 1, \quad \text{if } k = 0, 1, \cdots, t-1$$

Suppose that a user or an algorithm rearranges $P_1, P_2, \ldots, P_{N_t}$ so that they are ordered as $Q_1, Q_2, \ldots, Q_{N_t}$.

This rearrangement can be expressed as the function $\phi$: $\{1,2, \ldots, N_t\} \to \{1,2, \ldots, N_t\}$ which is a cone to one correspondence. Thus $\phi$ satisfies the following relation:

$$Q_n = P_{\varphi(n)}, \quad \text{for } 1 \leq n \leq N_t$$

Namely, $\phi$ is the rearrangement information defined by a user or by an algorithm.

Let us now explain the process of determining the index of $Q_1, Q_2, \ldots, Q_{N_t}$.

Define INDEX(n) ($1 \leq n \leq t$) to be the ordinal number of points which is first visited among $\{Q_1, Q_2, \ldots, Q_n\}$ while the contour containing $Q_n$ is being traversed backward from $Q_n$.

For example, in item 380 of FIG. 3B, the numbers on the fourth line are information about $Q_4$. The number '3' in item 362 is the index of $Q_4$, that is INDEX(4)=3. This can be understood as follows : start from $Q_4$; then $Q_3$ is the first point encountered among $Q_1, Q_2, Q_3$, and $Q_4$ when the outer boundary is traversed backward from $Q_4$. Thus, INDEX(4)= 3.

Figure 6A:
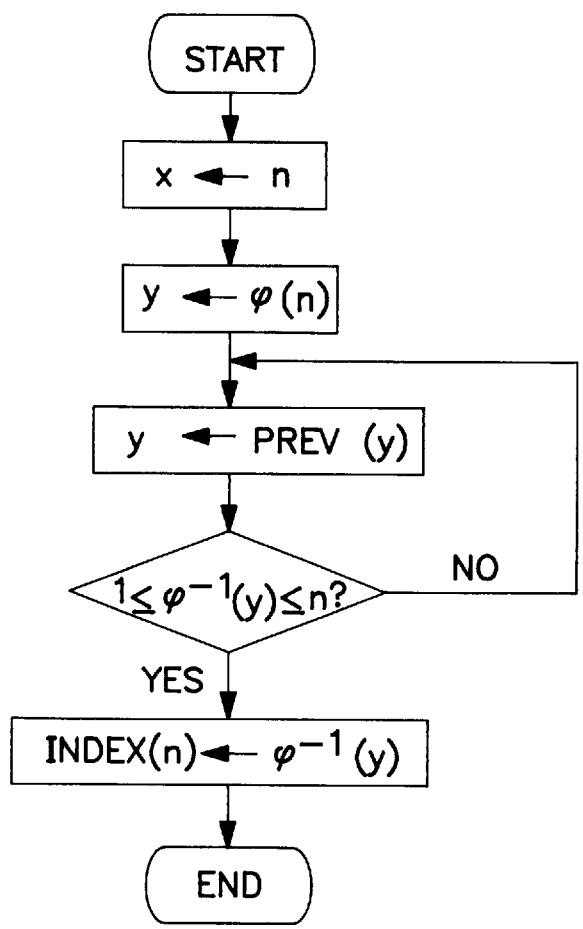
FIG. 6A shows an example of a general algorithm for the index assignment.

The algorithm and flow chart searching for the INDEX(n) can be expressed as in FIG. 6A.

The completion of the 362 of FIG. 3B can be explained further by inspecting FIG. 5 with INDEX function. Point 1 has 1 its the index since there is only point 1 itself on the first closed contour. Point 2 is a point in the first closed contour and, since there exist only points 1 and 2 on the first closed contour, the index of point 2 is 1, resulting in 1. And again, since point 3 belongs to the first closed contour and is the closest along the boundary to point 2 in the negative direction among points 1, 2 and 3 in FIG. 5, the index of point 3 is 2. Point 4 is on the first closed contour. And since point 4 is the closest along the boundary to point 3 in the negative direction among points 1, 2, 3 and 4 in FIG. 5, the index of point 4 is 3.

Point 5 is not connected to any of the points 1, 2, 3 and 4 because it is the beginning point of the second closed contour. At the same time, as there is no other point among points 1, 2, 3, 4 and 5 in the second closed contour except point 5, the index of point 5 is 5. Point 6 is on the second closed contour, and since there are only points 5 and 6 on the second closed contour, the index of point 6 is 5. Point 7 is on the second closed contour, and since it is the closest along the boundary to point 6 in the negative direction among points 1 to point 7, the index of point 7 is 6. Point 8 is on the second closed contour and since it is the closest along the boundary to point 7 in the negative direction among points 1 to point 8, the index of point 8 is 7. Likewise, each on-point can be assigned an index, and item 362 is now completed.

The above steps illustrate how data in FIG. 2B can be transformed to that in FIG. 3B. Other outline fonts, such as the postscript font using the cubic Bezier curve, can be transformed to a similar data format of the PR font. However, this still remains in the spirit and the scope of the present invention.

But in so doing, the off-point coordinates associated with each on-points must be recorded in item 360 in FIG. 3B instead of the tangent vectors in the positive and negative directions, as recorded in item 360 of FIG. 3B.

The hinting information is important when transforming the control information of FIG. 2A to control the information of FIG. 3A. There are two ways to transform the hinting information: one is to maintain the relevant hinting information at each level, and the other is to push all the hinting information to the last level. The former enables hinting at each step when rendering the PR font progressively along with the level. The latter is used when hinting is not needed or is not workable in the middle of the steps.

Likewise, the original glyph information of the character expressed in FIG. 2A can be transformed to the glyph information in the PR font method in the order of $Q_1, Q_2, \ldots, Q_{N_t}$.

Figure 6B:
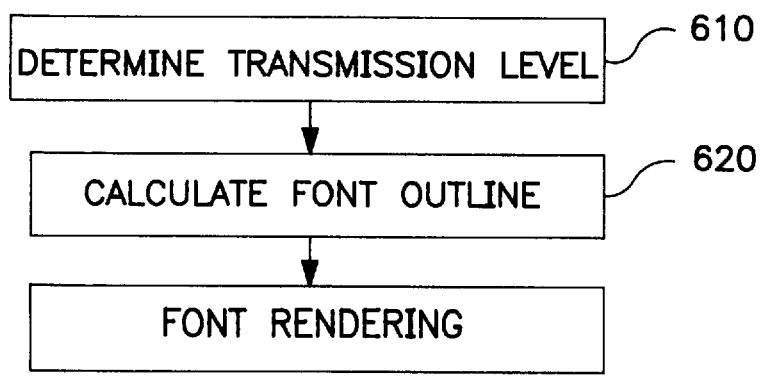
FIG. 6B shows an example of the transmitting and rendering of the PR font.

An example of the progressively transmitting and rendering method of the font with the PR font data will now be explained. FIG. 6B is an illustration of this procedure. Data is transmitted successively from the lower level to the higher level. Namely, items 380 (level 1), 382 (level 2), 384 (level 3), 386 (level 4), 388 (level 5), 390 (level 6) and 392 (level 7) of FIG. 3B will be transmitted in sequence, and more than one of the items may be transmitted as one group.

In step 610 of FIG. 6B, the transmission level will be determined by the user's request or through the transmission environment. At each stage, data belonging to the levels, excluding those already transmitted levels, will be additionally transmitted.

For example, suppose that data in level 1 and level 2, that is items 380 and 382 in FIG. 3B, are already transmitted, and suppose that data must be transmitted up to level 5. Then the additional data that must be transmitted are at the levels 3, 4 and 5, which are items 384, 386, 388 in FIG. 3B.

In step 620 of FIG. 6B, the font outline will be calculated. As only partial information is available at each stage, unless the data up to the last level are all transmitted, it is natural to display only the available data in the PR font display.

The following decision method is an algorithm that computes the outline out of the data of the level transmitted up to a particular point in time.

General Decision Method on the Connection Status

Suppose first that the index information up to the m-th points, $Q_1, Q_2, \ldots, Q_m$, are already present. Consequently, INDEX(n) ($1 \leq n \leq m$) is also defined. Then, FORWARD: $\{1,2,\ldots,r\} \to \{1,2,\ldots,r\}$ is defined as follows: FORWARD(n) for $1 \leq r \leq N_t$ and $1 \leq n \leq r$ indicates the ordinal number of the point which appears first among $Q_1, Q_2, \ldots, Q_r$ if the boundary contour is traversed from $Q_n$ in the positive direction of the closed contour containing $Q_n$. Therefore, the function $FORWARD_r$ is the information expressing the connection condition of $Q_1, Q_2, \ldots, Q_r$ on the closed contour. The purpose of this procedure is to quickly determine $FORWARD_m$ from $FORWARD_{m-1}$ which is already known. This certainly is the case for the PR font. The connection status with point m added can be determined by the known connection status up to point m−1. $FORWARD_m$ can be defined by following formula:

$$FOWARD_m(n) = \begin{cases} m, & n = INDEX(m) \\ FORWARD_{m-1}(INDEX(m)), & n = m \\ FOWARD_{m-1}(n), & \text{other} \end{cases}$$

where $$1 \leq n \leq m$$

This general method of determining the connection status can be illustrated with the example in FIG. 3B. Assume that level 1, that is item 380 of the data in FIG. 3B, has been transmitted. Thereby, the total number of closed contours that have to be rendered is two, which are the first and second closed contours, and the 8 points from point 1 to point 8, that is the points listed in item 380 in FIG. 3B, will be on these two closed contours.

Figure 7:
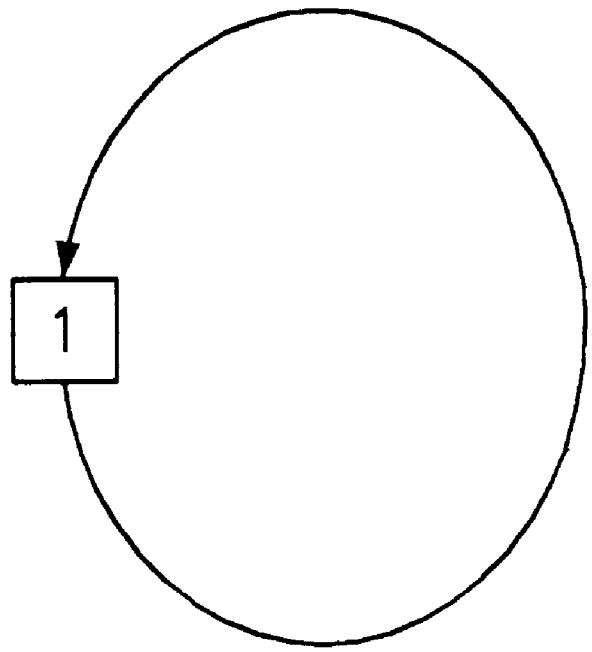
FIG. 7 shows the connection condition of point 1.

FIG. 7 shows the connection status of the points on each closed contour with point 1 only. This has been determined through the index information that point 1 up to now is the point closest to point 1 in the negative direction on the closed contour.

Figure 8:
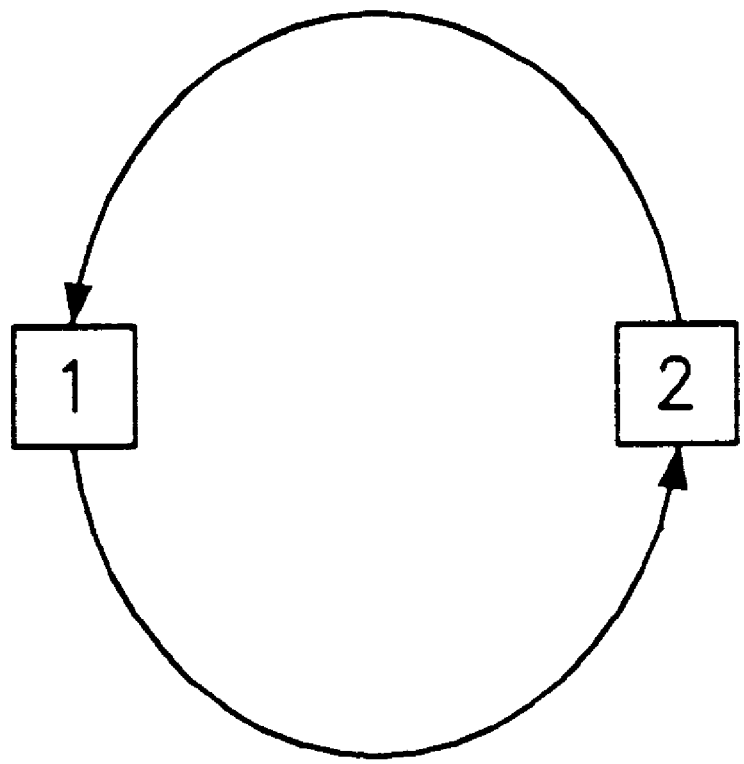
FIG. 8 shows the connection condition of points 1 and 2.

FIG. 8 is the connection status of the point on each closed contour with points 1 and 2 only. This has been determined through the information that the index of point 2 is 1, that is point 1 is the point closest to point 2 in the negative direction.

Figure 9:
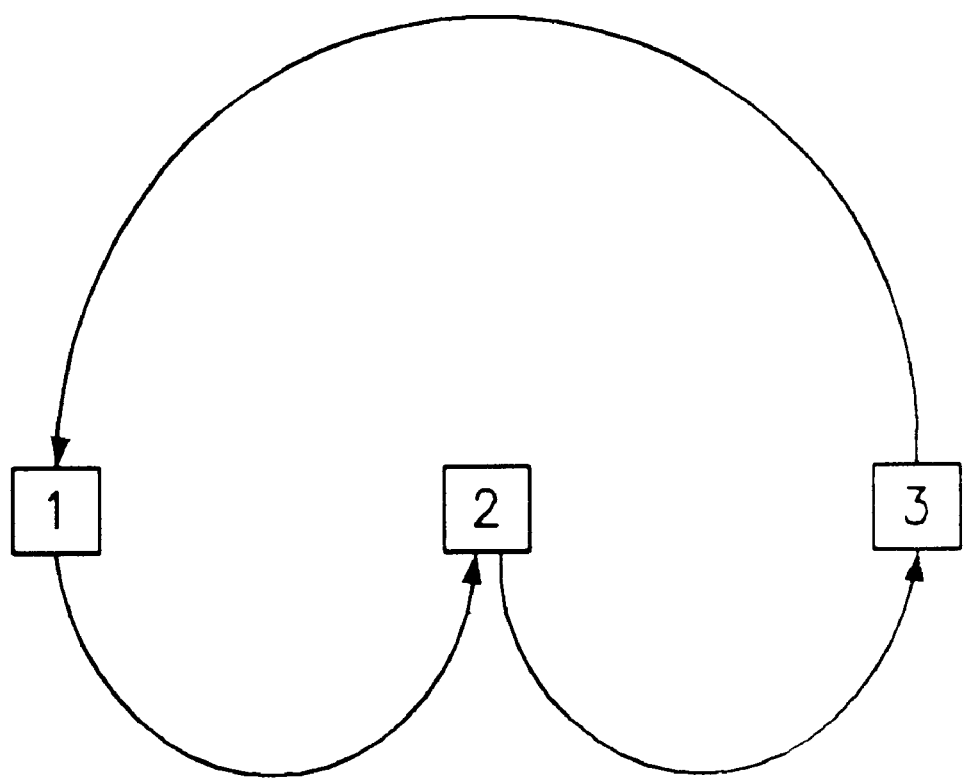
FIG. 9 shows the connection condition of points 1, 2 and 3.

FIG. 9 is the connection status of the points on each closed contour with points 1, 2 and 3 only. This has been determined through the information that the index of point 3 is 2, that is point 2 is the point closest to point 3 in the negative direction.

Figure 10:
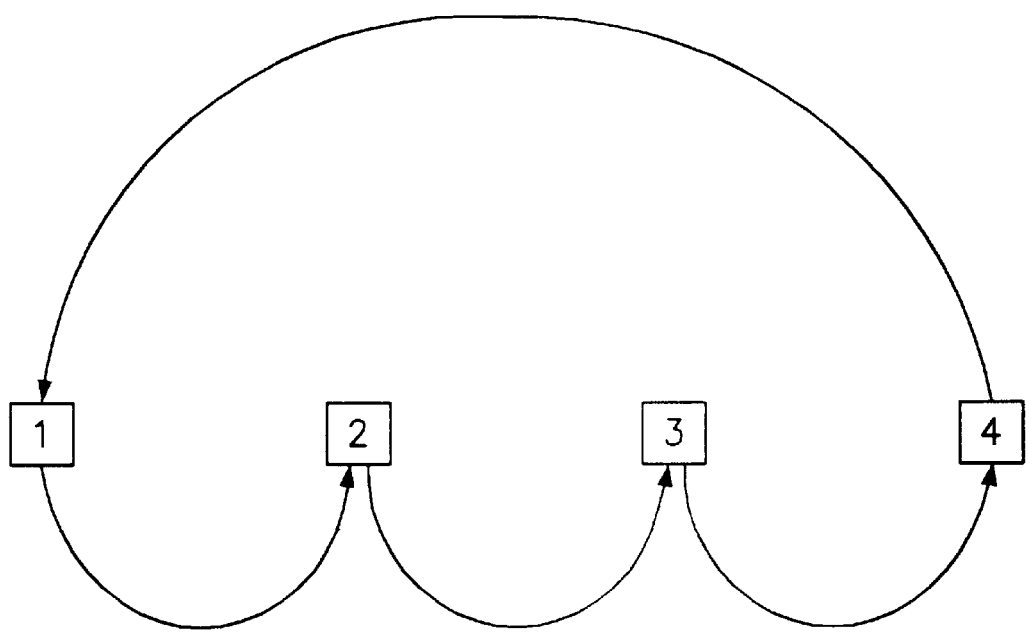
FIG. 10 shows the connection condition of points 1, 2, 3 and 4.

FIG. 10 is the connection status of the points on each closed contour with points 1, 2, 3 and 4 only. This has been determined through the information that the index of point 4 is 3, that is point 3 is the point closest to point 4 in the negative direction.

Figure 11:
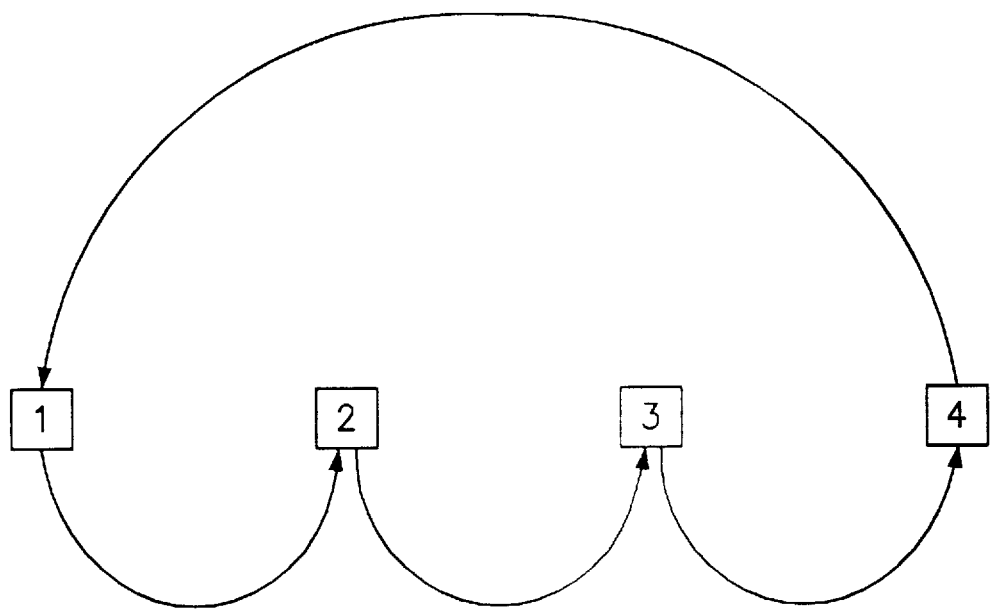
FIG. 11 shows the connection condition of points 1, 2, 3, 4 and 5.
Figure 11:
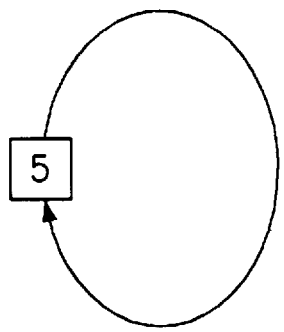

FIG. 11 is the connection status of the points on each closed contour with points 1, 2, 3, 4 and 5 only. This has been determined through the information that the index of point 5 is 5, that is point 5 itself is the point closest to point 5 in the negative direction.

Figure 12:
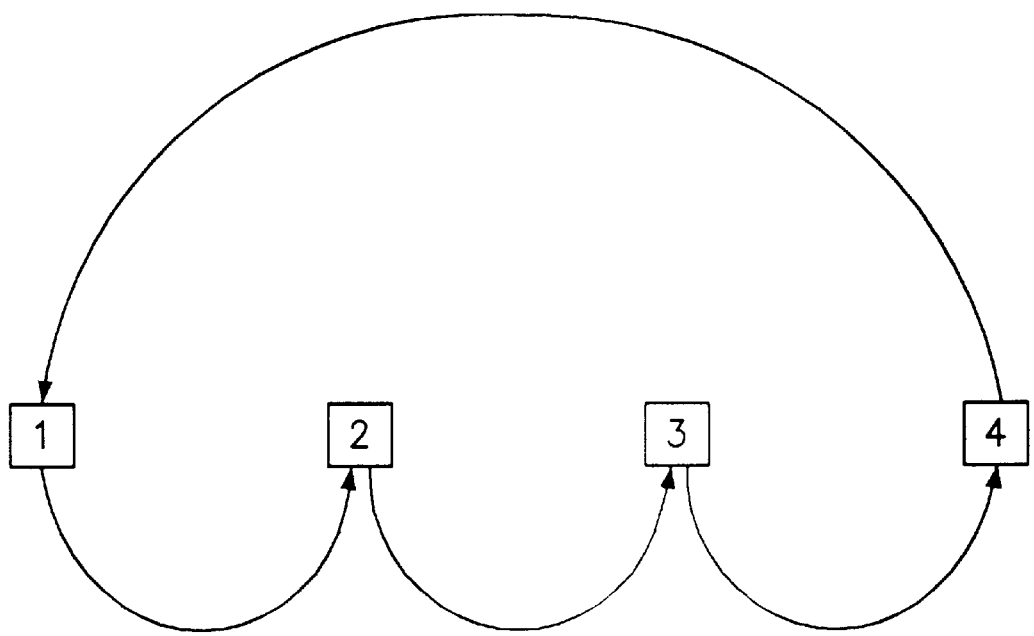
FIG. 12 shows the connection condition of points 1, 2, 3, 4, 5 and 6.
Figure 12:
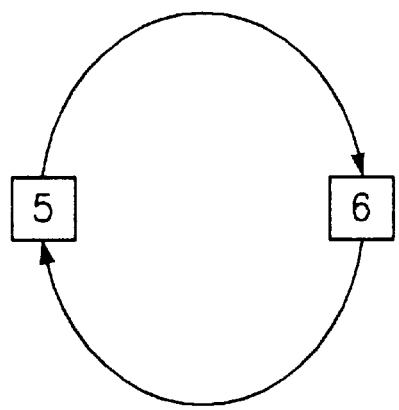

FIG. 12 is the connection status of the points on each closed contour with points 1, 2, 3, 4, 5 and 6 only. This has been determined through the information that the index of point 6 is 5, that is point 5 is the point closest to point 6 in the negative direction.

Figure 13:
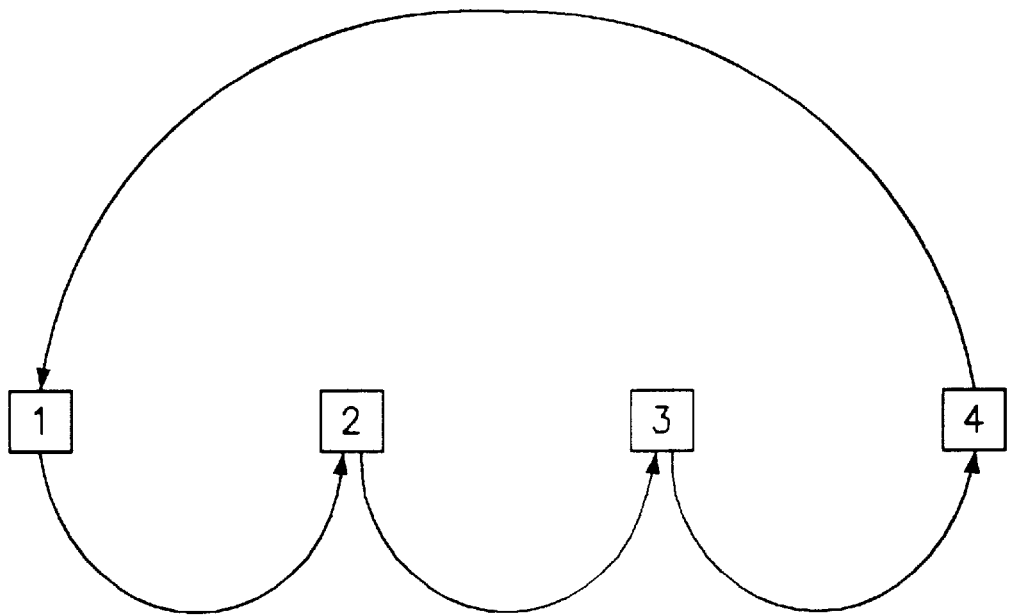
FIG. 13 shows the connection condition of points 1, 2, 3, 4, 5, 6 and 7.
Figure 13:
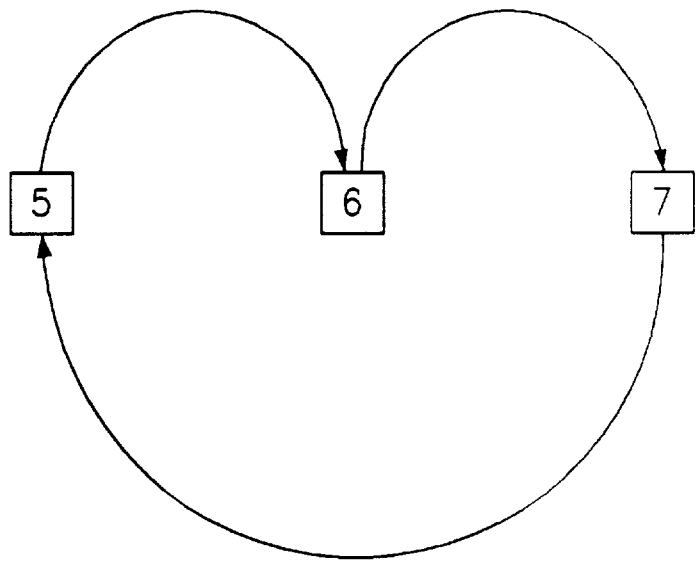

FIG. 13 is the connection status of the points on each closed contour with points 1, 2, 3, 4, 5, 6 and 7 only. This has been determined through the information that the index of point 7 is 6, that is point 6 is the point closest to point 7 in the negative direction.

Figure 14:
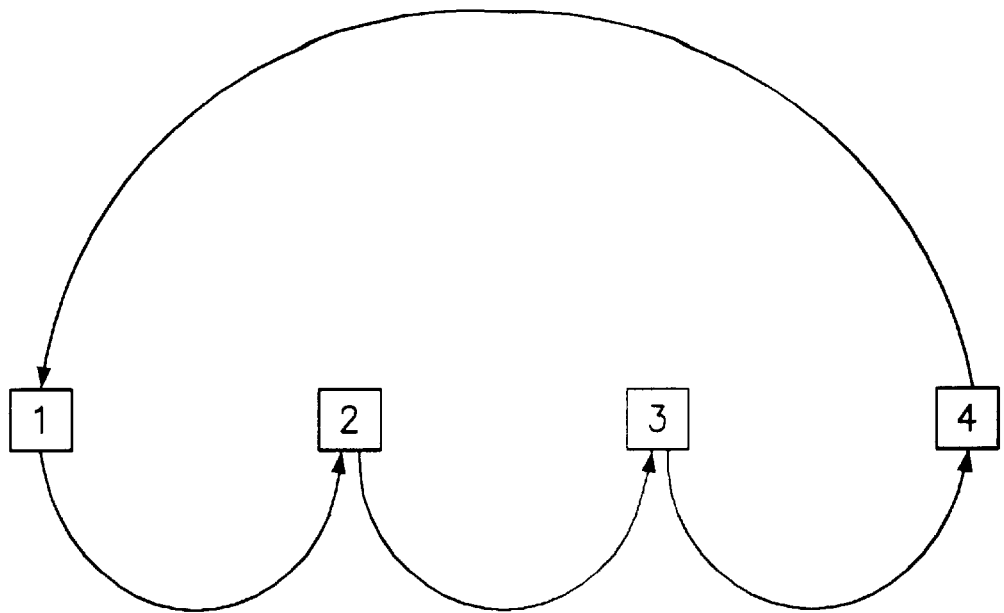
FIG. 14 shows the connection condition of all points in level 1.
Figure 14:
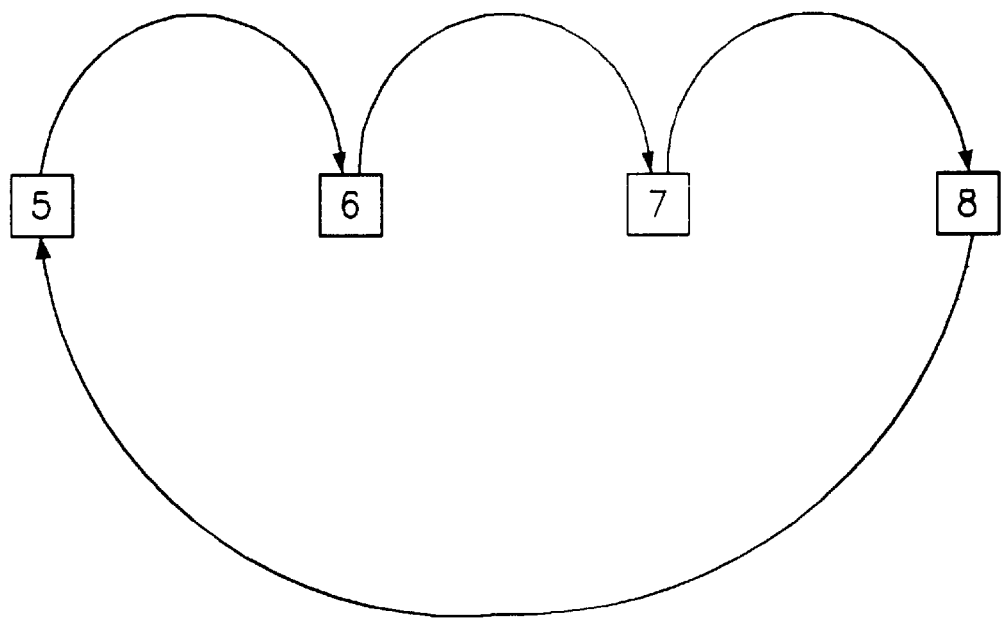
Figure 15:
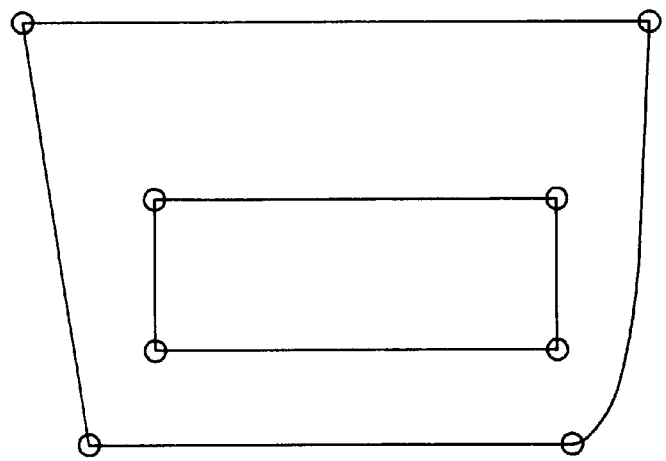
FIG. 15 shows the display results up to the first level.
Figure 16:
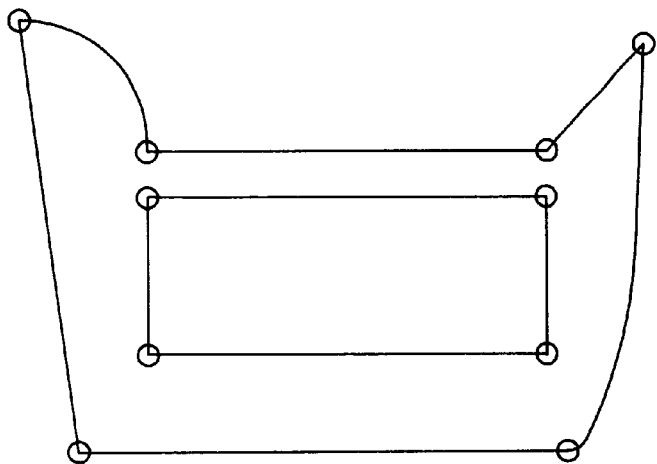
FIG. 16 shows the display results up to the second level.
Figure 17:
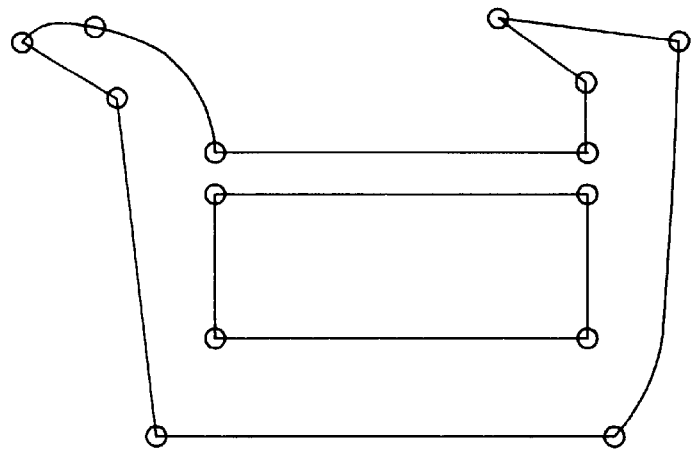
FIG. 17 shows the display results up to the third level.
Figure 18:
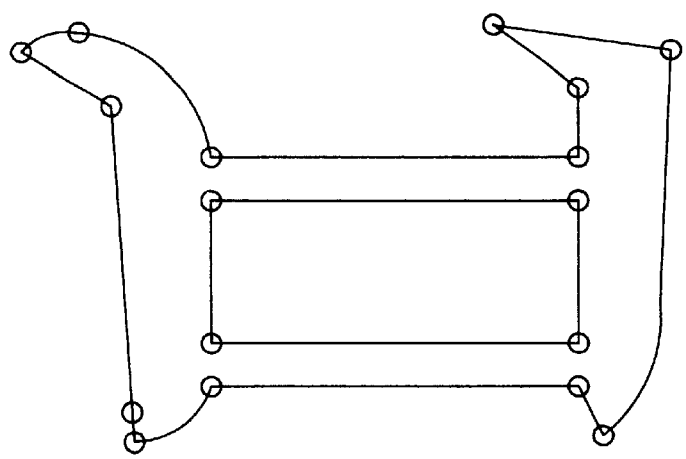
FIG. 18 shows the display results up to the 4th level.
Figure 19:
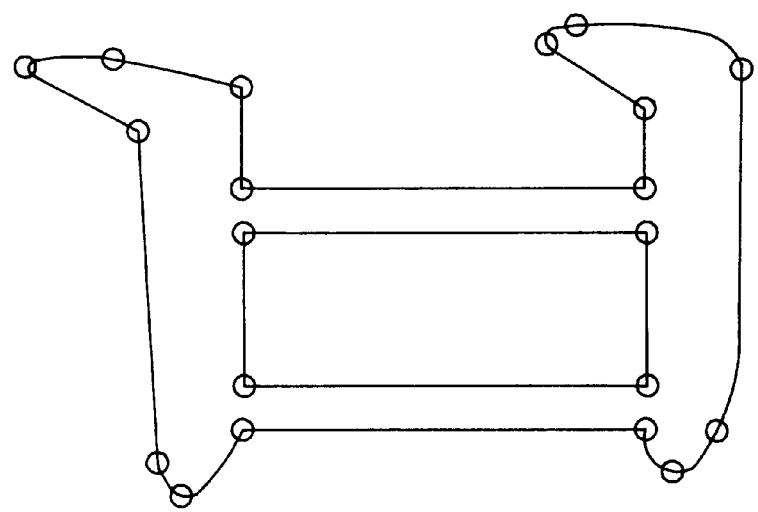
FIG. 19 shows the display results up to the 5th level.
Figure 20:
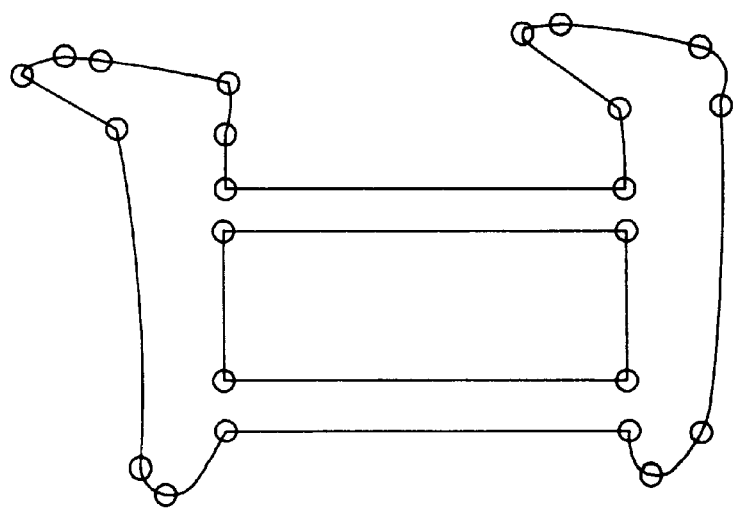
FIG. 20 shows the display results up to the 6th level.
Figure 21:
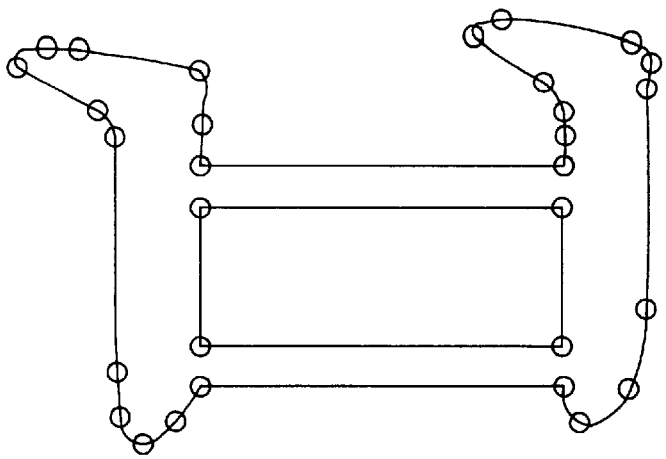
FIG. 21 shows the display results up to the 7th level.

FIG. 14 shows the determined connection status of the points on the closed contour up to level 1 using this method.

As shown above, if the connection status of the points up to the established number is given and the other point is added, the connection status up to the next point can be determined through using the point index of the new number. This method has the merit of both reducing the file size of the PR font, since each point has an unchangeable index in the file, and dynamically recognizing the connection status of the points, whenever each point is added on the closed contour, so that they can be saved in the memory.

In the case when the quadratic curve is used in the PR font outline expression, each closed 2 on-points will be connected through the coordinates of those on-points and the direction vector of the boundary curve. There are usually two points, $P_1$ and $P_2$, and the direction vectors at $P_1$ and $P_2$ are $v_1$ and $v_2$, respectively. In this case, the quadratic curve c(t) connecting with $P_1$, $P_2$ is as follows:

$$c(t)=(1-t)^2 P_1 + 2(1-t) t\, P + t^2 P_2,\ 0 \leq t \leq 1^1$$

Here P is the intersection point of the line in the direction of $v_1$ passing through point $P_1$ and the line in the direction of $v_2$ passing through point $P_2$. If the off-point Q is directly given, instead of the computation above, the quadratic curve c(t) connecting $P_1$ and $P_2$ is as follows:

$$c(t)=(1-t)^2 P_1 + 2(1-t) t Q + t^2 P_2,\ 0 \leq t \leq 1$$

When the cubic Bezier curve is used as the graphic primitive, each 2 on-points on each closed contour will be connected through two off-points. The cubic Bezier curve c(t) connecting $P_1$ and $P_2$ can be formulated as follows:

$$c(t)=(1-t)^3 P_1 + 3(1-t)^2 t\, R_1 + 3(1-t) t^2 R_2 + t^3 P_2,\ 0 \leq t \leq 1$$

Here $R_1$ and $R_2$ are off-points.

FIGS. 15, 16, 17, 18, 19, 20 and 21 are the illustrations of the progressive rendering of the outline of the calculated character 'ㅂ' calculated with data up to levels 1, 2, 3, 4, 5, 6 and 7.

When being progressively rendered, according to the objective of the user and the environment, hinting can be progressively applied with the hinting information at each step. When hinting is not needed, or is useless in the middle step because of problems such as the transmission speed of the PR font and the display speed etc., it is applied only in the last step of the PR font rendering.

The method of this invention enables the font character to be expressed through the level information in each step, but it has a weak point. That is to say that if the rasterized character in one level must be expressed in more detail in the following step, it must erase all of the calculated raster bitmap image and must recalculate a new raster bitmap. This is because the algorithm above does not give a clue as to how to obtain the relation between the pattern of the bitmap obtained in the new level and in the former level. The recalculation will increase the total time. Although, the PR font method in the present invention has the merit of making the PR font easily because it only adds level information to the given control point without doing much to the data in the conventional format, its weak point lies in duplicate rasterization.

Medial axis transform is a way of overcoming this weak point. In medial axis transform, a planar shape can be expressed and restructured as maximal inscribed circles. First, the medial axis is a collection of the centers of maximal inscribed circles, and when the radius information of the maximal inscribed circles is added, it is referred to as the medial axis transform. The medial axis transform was first studied by Blum, and after him, many authors, including D. T. Lee, R. L. Drysdale, M. Held, V. Srinivasan, L. R. Nackman, and C. K. Yap have studied and suggested various methods of calculating the medial axis transform. More recently, the present inventors have also written papers on computing the medial axis transform. Therefore, there are many practical ways of computing the medial axis transform; and it should be noted that the present invention presumes the method of finding the medial axis transform is of public knowledge.

Figure 23:
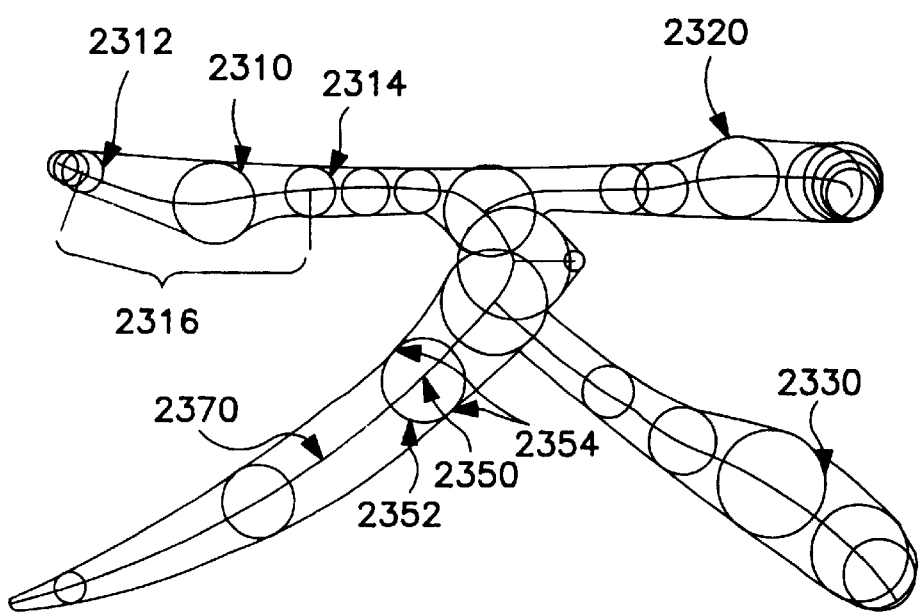
FIG. 23 shows the second example us ed to explain the localized rasterization.

FIG. 23 illustrates the shape of the Korean Jamo 'ㅈ' and its medial axis 2370. Usually, the points where the maximal inscribed circle meets with the boundary curve are called the contact points.

The reference number 2350 is a medial axis point, 2352 the maximal inscribed circle having 2350 as the center, and 2354 indicates the two contact points.

The reference number 2316 is then part of the shape lying between the maximal inscribed circle 2312 and 2314.

Figure 22:
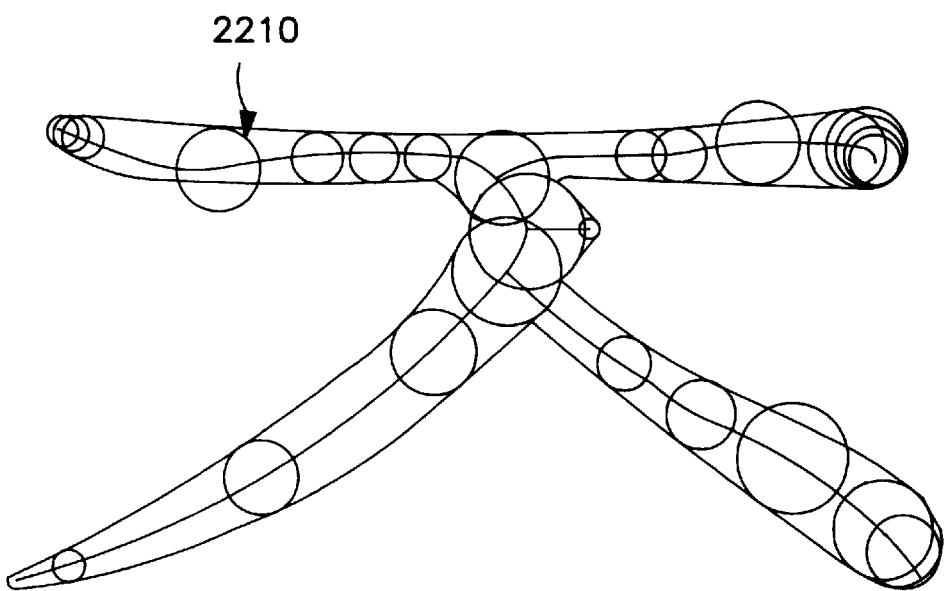
FIG. 22 shows the first example used to explain the localized rasterization.

In FIG. 22, the boundary curve is computed for the case when the maximal inscribed circle, which is marked as 2210 (thus the corresponding contact point), is not yet selected. In FIG. 23, the boundary curve is computed for the case when the maximal inscribed circle, which is marked as 2310, is selected. Similarly, several other circles are not selected in FIG. 22. As can be seen by comparing FIG. 22 to FIG. 23, the selection of 23 can only influence the part between 2312 and 2314, and not any other parts of the shape. During the transition from FIG. 22 to FIG. 23, 2310, 2320 and 2330 are added, and the results influence only the applied parts.

When this method is applied, the rasterized bitmap in FIG. 22 can mostly be used; and the addition of the level information only partially influences the applied parts. This is referred to as localized rasterizing.

Localized rasterizing can easily be applied to elements comprising of the data based on medial axis transform. This invention can easily be adapted to the data using the medial axis transform. This modification is still in the spirit and the scope the present invention.

Since this invention can be substituted, transformed and modified within the range of the technical knowledge of the invention by a person possessing the common knowledge of the technical field to which the invention belongs, the present invention is not only limited to the explained examples and the attached figures.

What is claimed is:

1. A progressively renderable font containing glyph information of each character, said glyph information of each character comprising:

coordinates of control points composing each said character;

level information for transmitting or rendering each said character progressively, wherein said control points are divided into a plurality of groups in accordance with said level information, wherein each group of said control points represents said character, and wherein said level information includes;

information associated with numbers of groups of said control points, and information indicating the numbers of control points which are included in each said group; and an indexing information for expressing connection relationships between said control points when each said character is rendered.

2. A progressively renderable font as claimed in claim 1, wherein each character further comprises control information.

3. A progressively renderable font as claimed in claim 2, wherein said glyph information further comprises predetermined progressive control information.

4. A progressively renderable font as claimed in claim 1, wherein said glyph information of each character contains information about tangent vectors in the positive and negative directions of a curve at each said control point.

5. A progressively renderable font as claimed in claim 1, wherein said control point is a contact point of a maximal inscribed circle.

6. A progressively renderable font containing glyph information of each character, said glyph information of each character comprising:

information of the maximal inscribed circle containing a control point as a contact point for establishing each said character;

level information for transmitting and rendering of each said character progressively wherein said control points are divided into a plurality of groups in accordance with said level information, wherein each group of said control points represents said character, and wherein said level information includes;

information associated with numbers of groups of said control points, and information indicating the numbers of control points which are included in each said group; and an indexing information for indicating progressive connection relationships between each said maximal inscribed circle when each said character is rendered.

7. A progressively renderable font as claimed in claim 5 or claim 6, further comprising a means being capable of partial rasterization by using information of each said maximal inscribed circle.

8. A conversion method to progressively render fonts comprising the steps of:

extracting glyph information of each character of an outline font;

providing level and index information to each control point of each said character wherein said control points are divided into a plurality of groups in accordance with said level information, wherein each group of said control points represents said character, and wherein said level information includes;

information associated with numbers of groups of said control points, and information indicating the numbers of control points which are included in each said group; and establishing a renderable font file by collecting information on each character provided in the above steps.

9. The conversion method as defined in claim 8 further comprising the steps of:

determining one of rendering levels, in accordance with a request of a user or an environment, and transmitting only additional data into a designated apparatus, excluding the already transmitted information, wherein said levels represent a character with various degrees of sharpness so that high levels elaborately express said character more than low levels;

calculating an outline of said character with data transmitted up to said determined level; and expressing said character by progressively rasterizing said character from a low level to a high level using the outline obtained in the calculating step.

\* \* \* \* \*

UNITED STATES PATENT AND TRADEMARK OFFICE
CERTIFICATE OF CORRECTION

PATENT NO. : 6,232,987 B1
DATED : May 15, 2001
INVENTOR(S) : Choi et al.

It is certified that error appears in the above-identified patent and that said Letters Patent is hereby corrected as shown below:

<u>Title page,</u>
References Cited, U.S. PATENT DOCUMENTS, after 5,898,439 delete "7/1999" and insert -- 4/1999 --.

Signed and Sealed this

Fifth Day of February, 2002

Attest:

JAMES E. ROGAN
*Attesting Officer*  *Director of the United States Patent and Trademark Office*

UNITED STATES PATENT AND TRADEMARK OFFICE
CERTIFICATE OF CORRECTION

PATENT NO.   : 6,232,987 B1
DATED        : May 15, 2001
INVENTOR(S)  : Choi et al.

It is certified that error appears in the above-identified patent and that said Letters Patent is hereby corrected as shown below:

<u>Title page,</u>
Item [73], Assignee, after "Ltd. (KR)" insert -- Hyundai Media Systems Co., Ltd. (KR); Hyeong In Choi (KR) --.

Signed and Sealed this

Eighteenth Day of June, 2002

*Attest:*

JAMES E. ROGAN
*Attesting Officer*   *Director of the United States Patent and Trademark Office*